(12) United States Patent
Ohashi et al.

(10) Patent No.: US 6,718,592 B2
(45) Date of Patent: Apr. 13, 2004

(54) WIPER PIVOT

(75) Inventors: Yasuo Ohashi, Yokohama (JP); Toshiyuki Fuke, Yokohama (JP)

(73) Assignee: Jidosha Denki Kogyo Kabushiki Kaisha, Kanagawa-Prefecture (JP)

(*) Notice: Subject to any disclaimer, the term of this patent is extended or adjusted under 35 U.S.C. 154(b) by 277 days.

(21) Appl. No.: 09/775,621

(22) Filed: Feb. 5, 2001

(65) Prior Publication Data

US 2001/0011831 A1 Aug. 9, 2001

(30) Foreign Application Priority Data

Feb. 4, 2000 (JP) ........................................ 2000-028004

(51) Int. Cl.⁷ ................................ B60S 1/02; F16D 9/00
(52) U.S. Cl. ........................ 15/250.31; 15/250.3; 403/2; 403/DIG. 3; 296/96.15
(58) Field of Search ........................... 15/250.3, 250.31, 15/250.34, 250.27; 384/297, 299, 300; 403/2, DIG. 3; 296/96.15

(56) References Cited

U.S. PATENT DOCUMENTS

| | | | | |
|---|---|---|---|---|
| 5,601,379 A | * | 2/1997 | Princet | 403/269 |
| 6,254,167 B1 | * | 7/2001 | Goto et al. | 296/96.15 |
| 6,317,918 B1 | * | 11/2001 | Kagawa et al. | 15/250.31 |
| 6,505,376 B1 | * | 1/2003 | Kagawa | 15/250.31 |

FOREIGN PATENT DOCUMENTS

FR 2 733 474 B1 6/1997

* cited by examiner

Primary Examiner—Robert J. Warden, Sr.
Assistant Examiner—Laura C Cole
(74) Attorney, Agent, or Firm—Sughrue Mion, PLLC

(57) ABSTRACT

A wiper pivot for a wiper apparatus of motor vehicles, which is provided with a pivot holder 3 having a shaft-holding portion 3b to rotatably support a pivot shaft 2, and a body-fixing portion 3d to be fixed to the vehicle body and formed in one body of resin together with the shaft-holding portion 3b through a connecting portion 3c, and the connecting portion 3c is further provided with a thin-walled destructible portion 4 to be destroyed at the time when impulsive force exceeding the predetermined value is applied on the pivot shaft 2.

5 Claims, 8 Drawing Sheets

WIPER PIVOT

BACKGROUND OF THE INVENTION

1. Field of the Invention

This invention relates to a wiper pivot for rotatably supporting a pivot shaft connected with a wiper arm in order to wipe the windshield of the motor vehicle by using the wiper motor.

2. Description of the Prior Art

As the wiper pivot for supporting rotatably the pivot shaft connected with the wiper arm, a wiper pivot to be used in the wiper linkage 50 shown in FIG. 8 has been known. A pair of wiper pivots 51 and 52 are used in the wiper linkage 50 shown in FIG. 8, and the first and second wiper pivots 51 and 52 are secured at the both ends of a pipe frame 55, respectively. The first and second wiper pivots 51 and 52 are respectively formed with a first and a second pivot holder 51a and 52a for rotatably supporting a first and a second pivot shaft 53 and 54 respectively and body-fixing portions 51b and 52b. The first and second wiper pivots 51 and 52 are fixed by screwing the respective body-fixing portions 51b and 52b on an inner panel disposed on the under side of a cowl top panel (not shown). The top ends of the first and second pivot shafts 53 and 54 are disposed protrudingly from the cowl top panel, and secured respectively with wiper arms fitted with wiper blades. The first and second pivot shafts 53 and 54 are connected to base ends of a first and a second pivot arm 56 and 57 which form a part of linkage 62 at the respective base ends thereof, and a first link connecting rod 58 which forms another part of the linkage 62 is connected between the respective free ends of the first and second pivot arms 56 and 57. Furthermore, one end of a second link connecting rod 59 which forms another part of the linkage 62 is connected to a position near to the free ends of the first pivot arm 56, and another end of the second link connecting rod 59 is connected to the free end of a motor arm 60 which forms the other part of the linkage 62. The motor arm 60 is secured with an output shaft 61a of a wiper motor 61 at the base end thereof.

In the aforementioned conventional wiper pivot, there is a problem in that an object (body) receives a remarkable impact from the protruding pivot shafts 53 and 54 at the time of collision of the object against the pivot shafts 53 and 54.

SUMMARY OF THE INVENTION

It is, therefore, a purpose of the present invention to provide a wiper pivot, which is possible to prevent the object (body) from the large impulsive force even if the pivot shaft collides with the object from the outside.

The above-mentioned purpose can be achieved by providing a wiper pivot according to this invention, which is characterized by comprising a pivot shaft provided with a base end connected to a wiper motor through a wiper linkage, and a top end to be disposed protrudingly from a body panel of the vehicle and connected to a wiper arm fitted with a wiper blade; and a pivot holder made of resin and provided with a shaft-holding portion having a shaft hole for rotatably supporting the pivot shaft and a body-fixing portion to be secured on the body panel of the vehicle, formed in one body together with the shaft-holding portion through a connecting portion; wherein the connecting portion of the pivot holder is provided with a thin-walled destructible portion to be destroyed at the time when impulsive force exceeding a predetermined value is applied on the pivot shaft.

In the wiper pivot according to this invention, if an object collides with the pivot shaft disposed protrudingly from the vehicle body panel and large impulsive force exceeding the predetermined value is applied to the pivot shaft, the destructible portion of the pivot holder is destroyed, whereby the shaft holding portion and the body-fixing portion of the pivot holder are separated from each other and the pivot holder is displaced in the direction of the vehicle body panel. Therefore, the large impulsive force can not be applied to the object even if the object collides with the pivot shaft.

DETAILED DESCRIPTION OF THE PREFERRED EMBODIMENT

Figure 1:
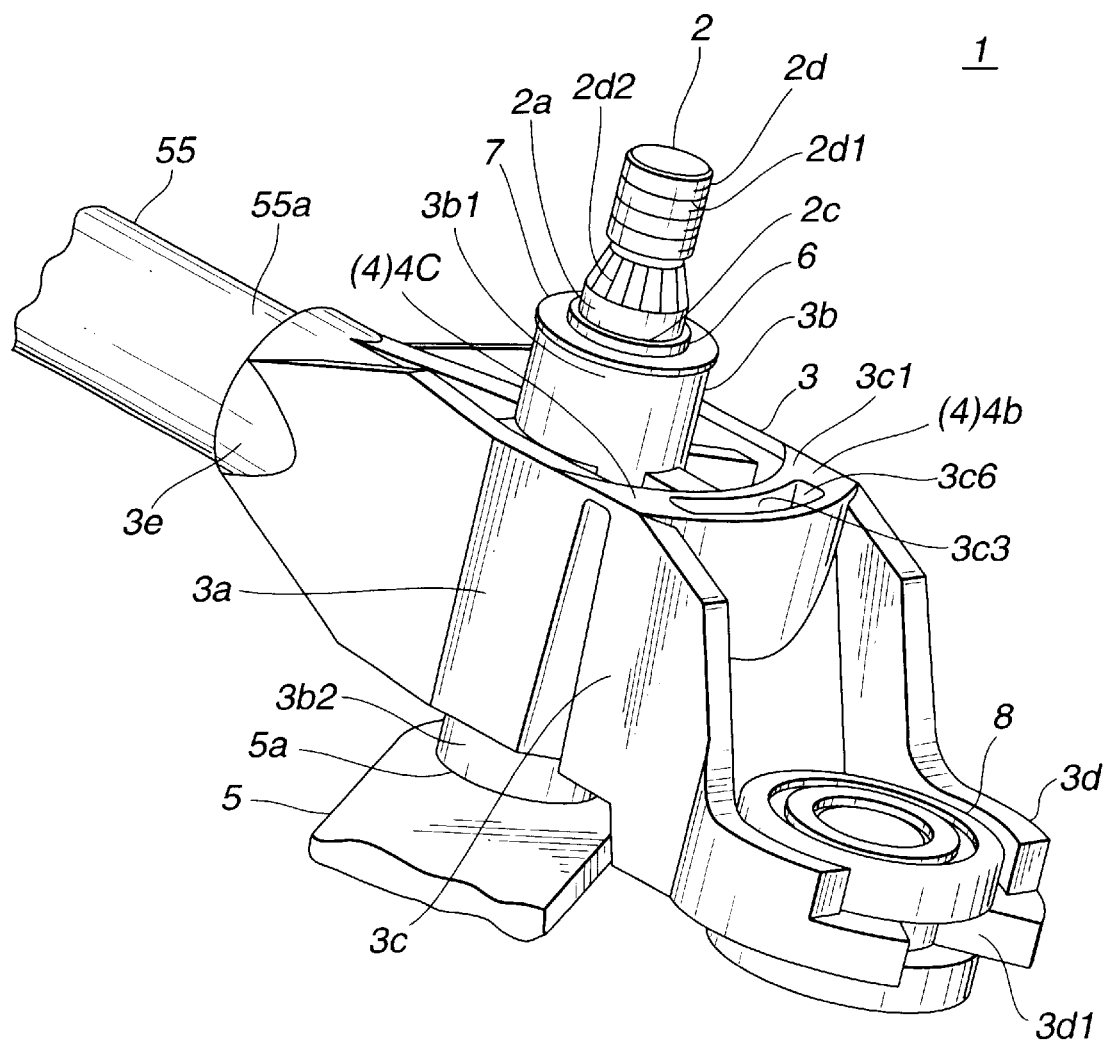
FIG. 1 is a perspective view illustrating an embodiment of the wiper pivot according to this invention.

An embodiment of the wiper pivot according to this invention will be described below on basis of FIGS. 1 to 7.

The wiper pivot 1 shown in figures is composed mainly of a pivot shaft 2, a pivot holder 3 and a destructible portion 4.

The pivot shaft 2 is formed with a pivot arm-fitting portion (not shown) at the base end of a round rod-shaped shaft body 2a. The shaft body 2a of the pivot shaft 2 is formed with a pin-groove 2c at a position near to the top end thereof. A wiper arm-fitting portion 2d is formed at the top end of the shaft body 2a on the upper side of the pin-groove 2c of the pivot shaft 2.

The shaft body 2a of the pivot shaft 2 is inserted rotatably in a shaft hole 3b3 formed in the pivot holder 3. At the pivot arm-fitting portion formed in the base end of the shaft body 2a of the pivot shaft 2 as mentioned above, a pivot arm 5 is secured through a wave washer (not shown) by caulking at a pivot shaft-fixing portion 5a thereof.

A C-shaped pin or stopper 6 is fitted in the pin-groove 2c of the pivot shaft 2. The outer diameter of the C-shaped pin or stopper 6 is larger than the outer diameter of the shaft body 2a of the pivot shaft 2. A plain washer 7 is disposed between the C-shaped pin 6 and a first projection 3b1 of the shaft-holding portion 3b of the pivot holder 3. The inner diameter of the plain washer 7 is slightly larger than the outer diameter of the shaft body 2a of the pivot shaft 2 and the outer diameter of the plain washer 7 is larger than the inner diameter of a shaft hole 3b3 formed in the pivot holder 3. The plain washer 7 is in contact with the first projection 3b1 of the shaft-holding portion 3b. The pivot arm 5 is secured at the base end of the shaft body 2a of the pivot shaft 2 and the C-shaped pin or stopper 6 is attached to the pivot shaft 2 through the plain washer 7 at the position near to the top end of the shaft body 2a. Accordingly, the pivot shaft 2 is prevented to come out from the shaft hole 3b3 formed in the shaft-holding portion 3b of the pivot holder 3.

The pivot shaft 2 is formed with a positive screw 2d1 and a serration 2d2 at the wiper arm-fitting portion 2d. The wiper arm-fitting portion 2d of the pivot shaft 2 is passed through a securing portion 20a formed in the base end of a wiper arm 20 shown in FIG. 7, whereby the serration 2d2 of the pivot shaft 2 is engaged with a serration receiver (not shown) formed at the securing portion 20a of the wiper arm 20. The positive screw 2d1 of the pivot shaft 2 is pierced into a hole formed in the securing portion 20a and is screwed into a nut (not shown), thereby securing the wiper arm 20 on the wiper arm-fitting portion 2d of the pivot shaft 2. Furthermore, a wiper blade 21 is fitted to the top end of the wiper arm 20 as shown in FIG. 7.

Figure 7:
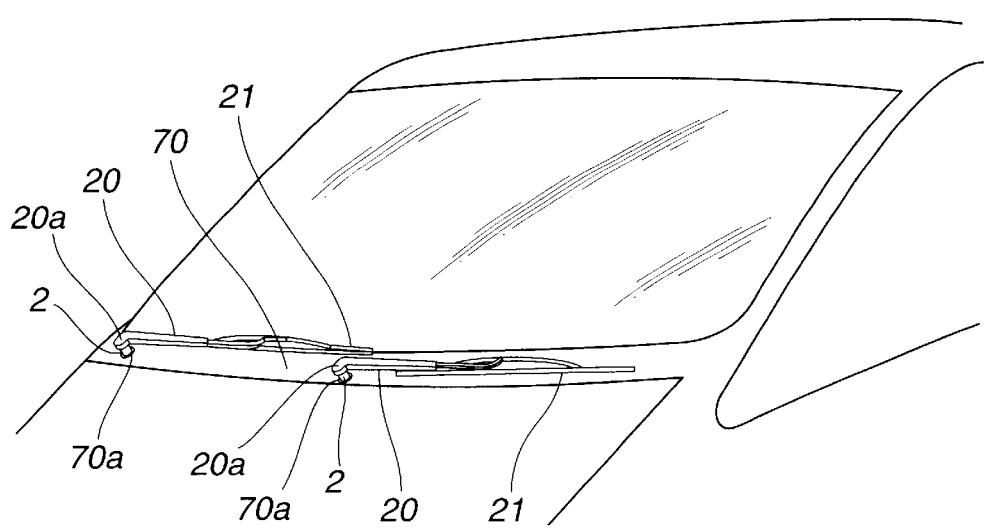
FIG. 7 is a perspective view illustrating the wiper pivot shown in FIG. 1 in the state of being mounted on the vehicle body.

The pivot arm 2 is disposed so that the wiper arm-fitting portion 2d of the pivot arm 2 may be protruded from a pivot hole 70a formed in a cowl top panel (body panel) 70 shown in FIG. 7. The wiper arm 20 fitted with the wiper blade 21 is secured to the pivot shaft 2. Therefore, if large impulsive force is applied to the wiper blade 21 or the wiper arm 20, the impulsive energy caused by the impulsive force is given to the shaft-holding portion 3b of the pivot holder 3 through the pivot shaft 2, the C-shaped pin or stopper 6 and the plain washer 7.

The pivot holder 3 is formed of resin and provided with a holder body 3a, a connecting portion 3c, a body-fixing portion 3d and a frame-connecting portion 3e in addition to the shaft-holding portion 3b described above in a united one body.

The holder body 3a is formed in a rectangular shape and disposed in the substantially center of the pivot holder 3. The shaft-holding portion 3b is formed in the center of the holder body 3a.

The shaft-holding portion 3b is formed in a hollow cylindrical shape, and formed with the first projection 3b1 protruding on the upper side of the holder body 3a and a second projection 3b2 protruding on the lower side of the holder body 3a.

The first projection 3b1 of the shaft-holding portion 3b is in contact with the plain washer 7 and the second projection 3b2 of the shaft-holding portion 3b is in contact with the wave washer (not shown) as described above.

The shaft-holding portion 3b is formed with the shaft hole 3b3 opened from the first projection 3b1 toward the second projection 3b2, and inserted rotatably with the shaft body 2a of the pivot shaft 2.

Figure 2:
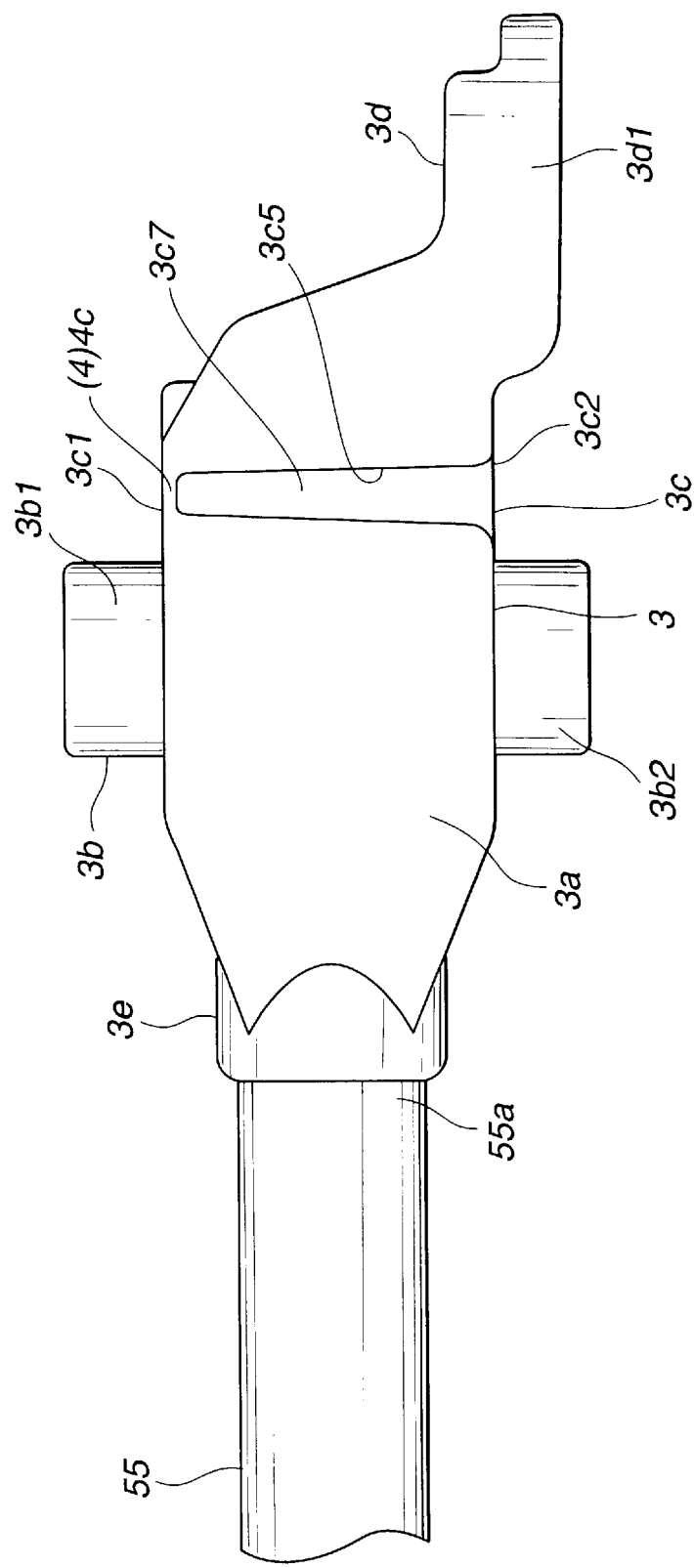
FIG. 2 is a side view of the wiper pivot shown in FIG. 1.

The connecting portion 3c is disposed so as to bridge between the holder body 3a and the body-fixing portion 3d on the right side of the holder body 3a shown in FIG. 2. The connecting portion 3c is formed with the destructible portion 4. The destructible portion 4 is composed of a first thin-walled portion 4a, a second thin-walled portion 4b and a third thin-walled portion 4c.

Figure 3:
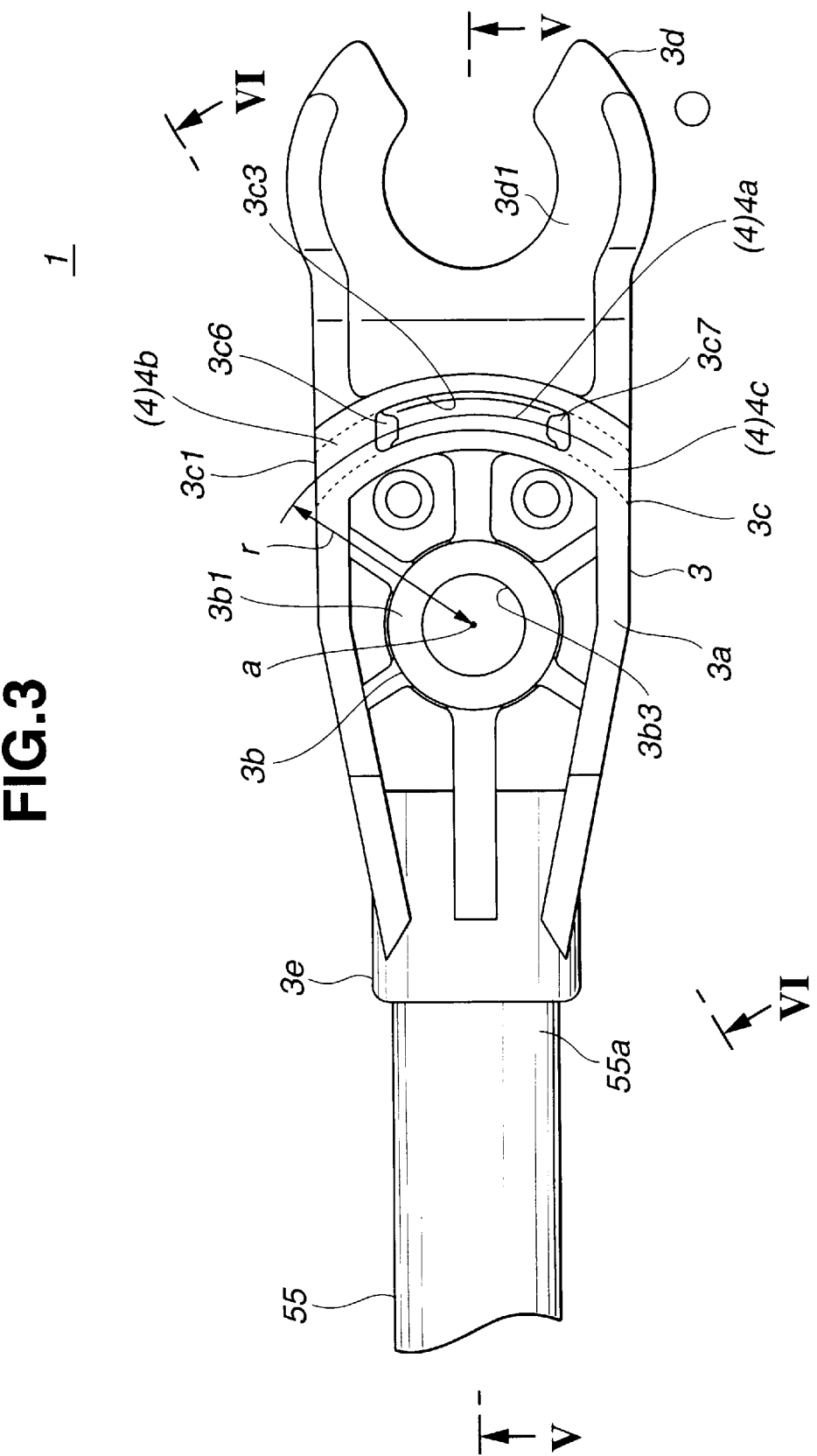
FIG. 3 is a top view of the wiper pivot shown in FIG. 2.
Figure 4:
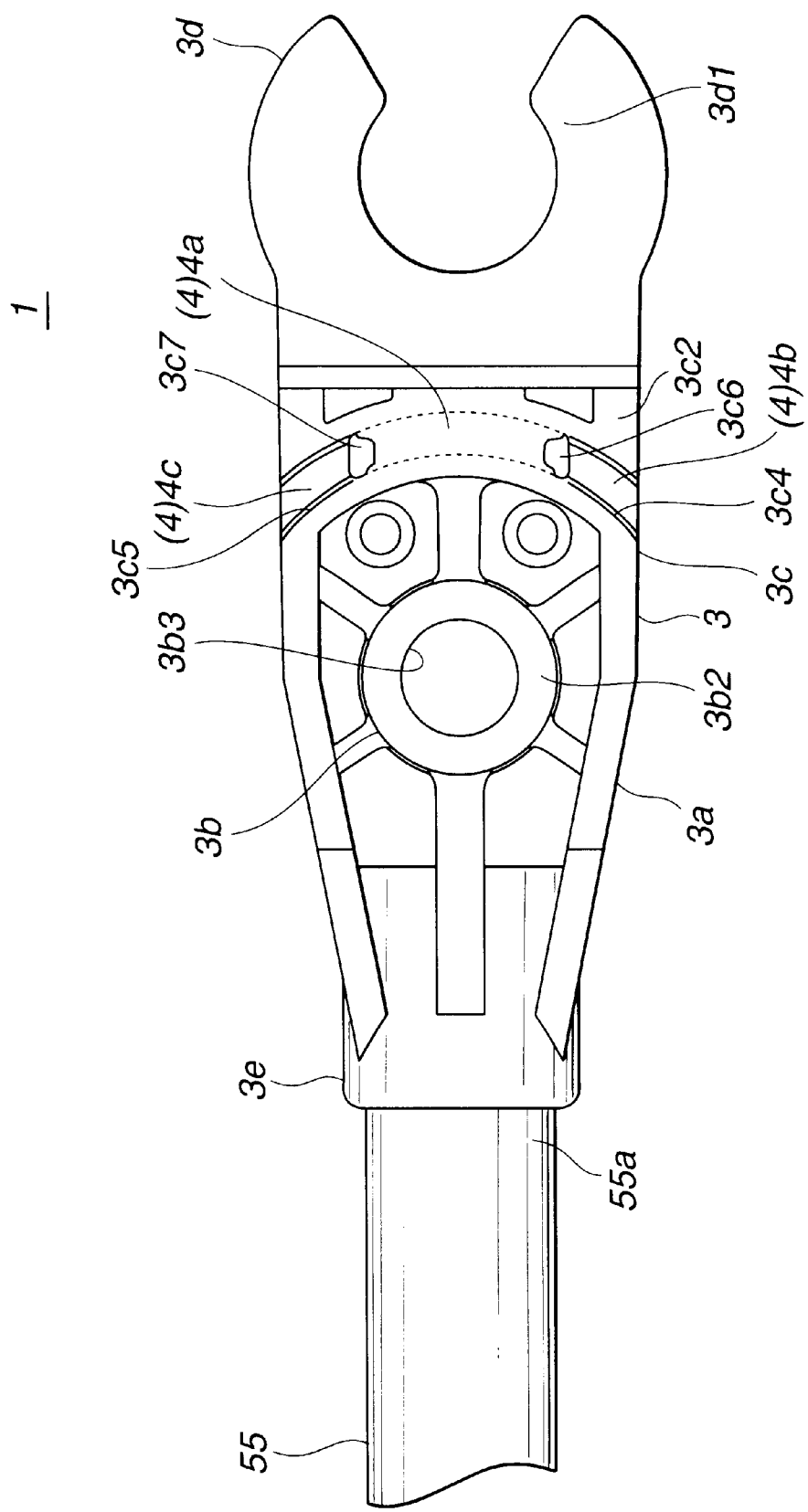
FIG. 4 is a bottom view of the wiper pivot shown in FIG. 2.
Figure 5:
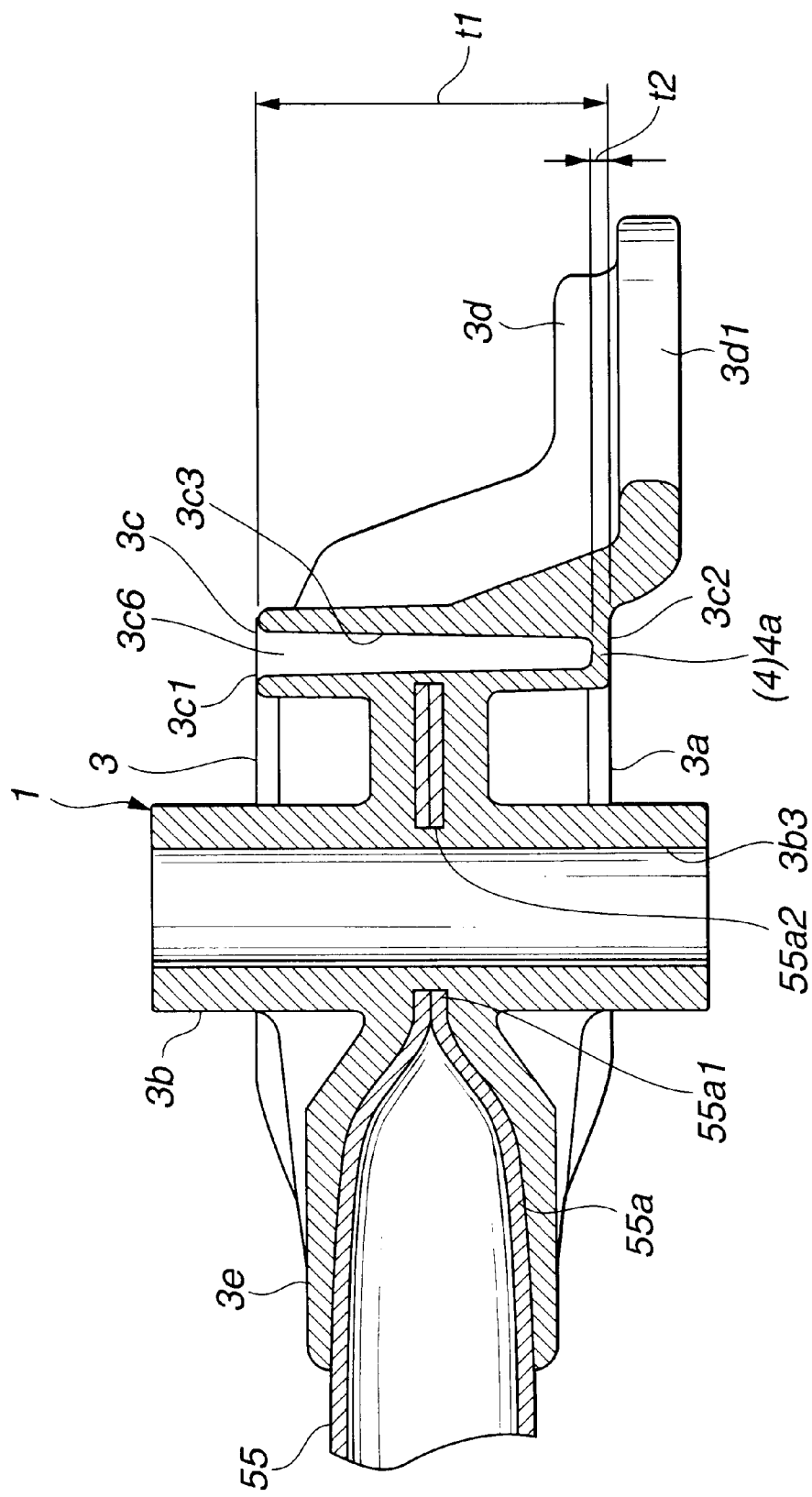
FIG. 5 is a cross sectional view taken on the lines V—V of FIG. 3.

The first thin-walled portion 4a of the destructible portion 4 is disposed in the center of the connecting portion 3c, and formed in a thin-walled shape on the side of a lower face 3c2 of a first hollow 3c3 cut out in a rectangular shape toward the lower face 3c2 from an upper face 3c1 of the connecting portion 3c. The first thin-walled portion 4a has thickness t2 sufficiently smaller than height t1 of the connecting portion 3c as shown in FIG. 5. The first thin-walled portion 4a and the first hollow 3c3 are formed in arcuate shapes on the circumference of a circle with a diameter of "r1" about the same center "a", which is also the center of the shaft hole 3b3 of the shaft-holding portion 3b as shown in FIG. 3.

Figure 6:
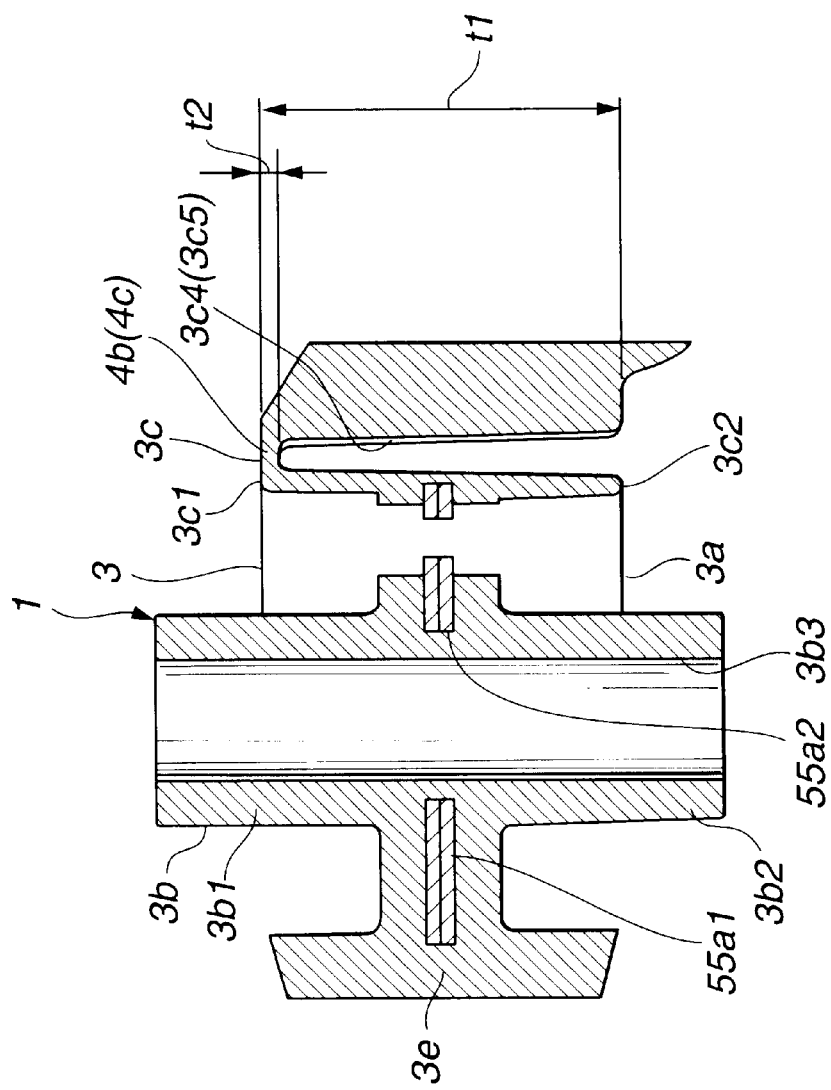
FIG. 6 is a cross sectional view taken on the lines VI—VI of FIG. 3.

The second thin-walled portion 4b of the destructible portion 4 is disposed on one side of the lateral of the connecting portion 3c, and formed in a thin-walled shape on the side of the upper face 3c1 of a second hollow 3c4 cut out in a rectangular shape toward the upper face 3c1 from the lower face 3c2 of the connecting portion 3c. The second thin-walled portion 4b has thickness t2 equal to the thickness of the first thin-walled portion 4a and sufficiently smaller than the height t1 of the connecting portion 3c as shown in FIG. 6. The second thin-walled portion 4b and the second hollow 3c4 are formed in arcuate shapes on the circumference of the circle with the diameter of "r1" about the center "a" of the shaft hole 3b3 of the shaft-holding portion 3b. A partition wall 3c6 is disposed between the first hollow 3c3 and the second hollow 3c4, and the second hollow 3c4 has an opening on the opposite side of that of the first hollow 3c3.

The third thin-walled portion 4c of the destructible portion 4 is disposed on the other side of the lateral of the connecting portion 3c so as to form a pair together with the second thin-walled portion 4b. The third thin-walled portion 4c is formed also in a thin-walled shape on the side of the upper face 3c1 of a third hollow 3c5 cut out in a rectangular shape toward the upper face 3c1 from the lower face 3c2 of the connecting portion 3c. The third thin-walled portion 4c is sufficiently small as compared with the height t1 of the connecting portion 3c and has thickness t2 equivalent to the thickness of the first and second thin-walled portions 4a and 4b as shown in FIG. 6. The third thin-walled portion 4c and the third hollow 3c5 are formed in arcuate shapes on the circumference of the circle with the diameter of "r1" about the center "a" of the shaft hole 3b3 in the shaft-holding portion 3b. A partition wall 3c7 is disposed between the first hollow 3c3 and the third hollow 3c5 and the third hollow 3c5 is opened on the opposite side of the opening of the first hollow 3c3.

The second thin-walled portion 4b, the first thin-walled portion 4a and the third thin-walled portion 4c of the destructible portion 4 are disposed continuously in the circumferential direction of the shaft hole 3b3 of the shaft-holding portion 3b between the shaft-holding portion 3b and the body-fixing portion 3d. Therefore, the connecting portion 3c is destroyed by absorbing the striking energy caused by shearing stress, bending stress or torsional stress applied on the shaft-holding portion 3b through the plain washer 7 from the C-shaped pin or stopper 6 at the time when the large impulsive force is applied on the wiper blade 21 or the wiper arm 20. Consequently, the shaft-holding portion 3b and the holder body 3a are separated from the body-fixing portion 3d. In this time, the striking energy applied to the shaft-holding portion 3b is uniformly given against the first, second and third thin-walled portions 4a, 4b and 4c, and the striking energy is absorbed infallibly by the destructible portion 4 because the first, second and third thin-walled portions 4a, 4b and 4c are formed in arcuate shapes on the circumference of the circle ahout the center "a" of the shaft hole 3b3 in the shaft-holding portion 3b.

The body-fixing portion 3d of the pivot holder 3 is formed continuously from the connecting portion 3c on the right side of the connecting portion 3c in FIG. 2. The body-fixing portion 3d is fitted with a shock-absorbable damper 8 made of rubber in a damper-fitting portion 3d1 formed in a forked shape.

A bolt (not shown) is passed through the damper 8 and screwed into the inner panel such as a dash upper panel disposed on the lower side of the cowl top panel, thereby securing the pivot holder 3 on the vehicle body at the body-fixing portion 3d.

The frame-connecting portion 3e of the pivot holder 3 is formed continuously from the holder body 3a on the left side of the shaft-holding portion 3b in FIG. 2. The frame-connecting portion 3e is formed at the end 55a of the pipe frame 55 (see FIG. 8) through the outsert moulding together with the holder body 3a, the shaft-holding portion 3b, the connecting portion 3c and the body-fixing portion 3d. The end 55a of the pipe frame 55 is compressed in a plate-like shape to form a plate portion 55a1, and formed with a round hole 55a2 in the plate portion 55a1. The shaft-holding portion 3b of the pivot holder 3 is moulded so as to locate the shaft hole 3b3 in the hole 55a2 as shown in FIG. 5.

Figure 8:
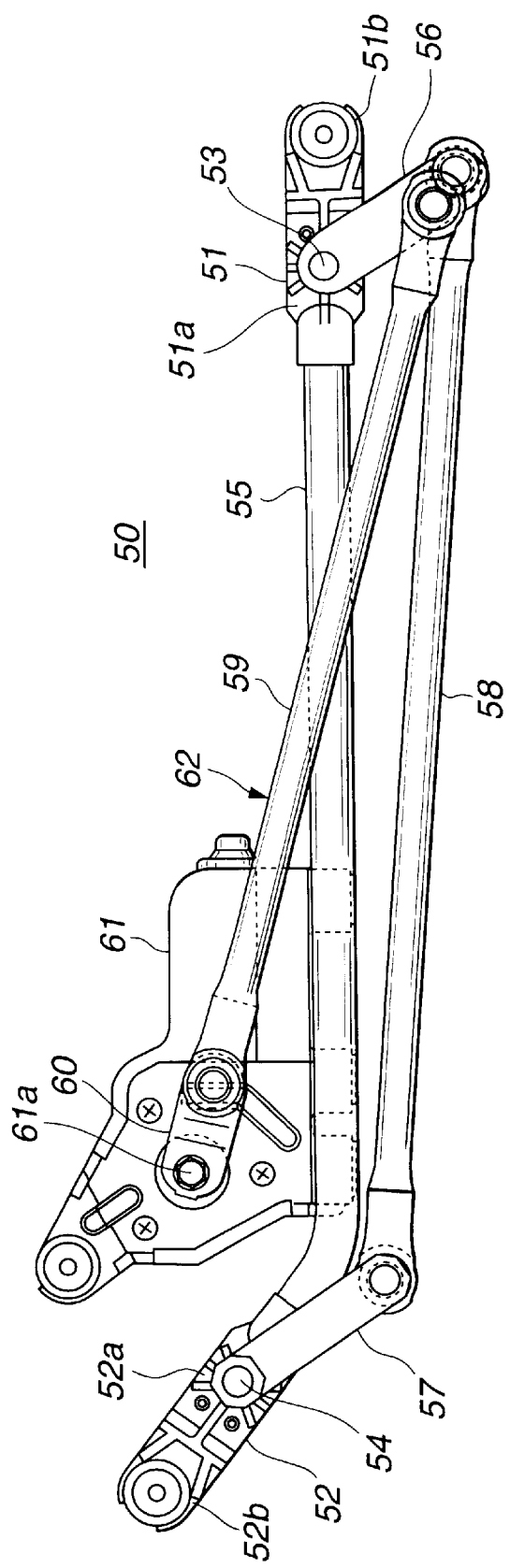
FIG. 8 is a bottom view of the wiper linkage used in the conventional wiper pivot.

A pair of such the wiper pivots 1 are disposed to the both ends of the wiper frame 55 of the wiper linkage 50 as shown similarly in FIG. 8, and mounted on the vehicle body by screwing the body-fixing portions 3d of the respective wiper pivots 1 on the inner panel of the vehicle body, furthermore the wiper arms 20 and the wiper blades 21 are fitted on the respective pivot shafts 2 protruding from the pivot holes 70a of the cowl top panel 70.

In the wiper pivot 1 structured as mentioned above, if the predetermined large impulsive force is applied to the wiper arm 20, the wiper blade 21 or the pivot shaft 2 by the collision with the object or body, the impulsive force is given to the shaft-holding portion 3b through the plain washer 7 from the C-shaped pin or stopper 6 of the pivot shaft 2, whereby the first, second and third thin-walled portions 4a, 4b and 4c of the destructible portion 4 are cut off by the impulsive force and the shaft-holding portion 4b and the holder body 3a are separated from the body-fixing portion 3d. Accordingly, the pivot shaft 2 is dislocated from the predetermined position in the pivot holder 3 and displaced in the lower direction of the cowl top panel, the impulsive force is received by the body panel having a plane portion and elasticity as compared with the pivot shaft 2, and it is possible to reduce the impulsive force applied on the object.

As mentioned above, in the wiper pivot according to this invention, the destructible portion of the pivot holder is destroyed in the case where the object collides with the pivot shaft disposed protrudingly on the body panel and large impulsive force exceeding the predetermined value is applied on the pivot shaft, whereby the shaft-holding portion is separated from the body-fixing portion of the pivot holder and it is possible to displace the pivot shaft in the direction of the body panel. Accordingly, an excellent effect can be obtained in that the large impulsive force is not applied on the object even if the object collides with the pivot shaft of the wiper pivot from the outside.

What is claimed is:

1. A wiper pivot for a wiper apparatus of motor vehicles, said wiper pivot comprising:

a pivot shaft provided with a base end connected to a wiper motor through a wiper linkage, and a top end to be disposed protrudingly from a body panel of the vehicle and connected to a wiper arm fitted with a wiper blade; and a pivot holder made of resin and provided with a shaft-holding portion having a shaft hole for rotatably supporting said pivot shaft and a body-fixing portion to be secured on the body panel of the vehicle, formed in one body together with said shaft-holding portion through a connecting portion;

wherein said connecting portion of the pivot holder is provided with a thin-walled destructible portion to be destroyed at the time when impulsive force exceeding a predetermined value is applied on the pivot shaft wherein said destructible portion of said connecting portion is composed of a first thin-walled portion formed on a face on one side of said connecting portion and a pair of a second and a third thin-walled portion formed on a face on another side of said connecting portion of the pivot holder; and wherein said first thin-walled portion of said destructible portion of said connecting portion is formed at the center of said connecting portion and said second and third thin-walled portions of said destructible portion are formed on both sides of said connecting portion of the pivot holder; and further wherein said shaft hole defines a vertical axis and said first thin-walled potion is vertically separated from said second and third thin-walled portions along said vertical axis.

2. A wiper pivot as set forth in claim 1, wherein said destructible portion of said connecting portion is so formed as to be destroyed and separates the shaft-holding portion of said pivot holder from said body-fixing portion of the pivot holder by shearing stress, bending stress or torsional stress caused between said shaft-holding portion and said body-fixing portion of said pivot holder.

3. A wiper pivot as set forth in claim 1, wherein said first, second and third thin-walled portion of said destructible portion of said connecting portion are formed in arcuate shapes having the center identical with that of the shaft hole of said pivot holder.

4. A wiper pivot as set forth in claim 1, wherein said pivot holder is connected with an end of a pipe frame of the wiper linkage at the shaft-holding portion through outsert moulding.

5. A wiper pivot as set forth in claim 4, wherein said pivot shaft is attached with a stopper on the top end of said pivot shaft and the impulsive force applied to said pivot shaft is transmitted to the shaft-holding portion through said stopper.

* * * * *